United States Patent
Su et al.

(10) Patent No.: US 10,341,241 B2
(45) Date of Patent: Jul. 2, 2019

(54) HISTORY-BASED CLASSIFICATION OF TRAFFIC INTO QOS CLASS WITH SELF-UPDATE

(71) Applicant: Hughes Network Systems, LLC, Germantown, MD (US)

(72) Inventors: Chi-Jiun Su, Germantown, MD (US); Kaustubh Jain, Germantown, MD (US); Se Gi Hong, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 236 days.

(21) Appl. No.: 15/348,837

(22) Filed: Nov. 10, 2016

(65) Prior Publication Data

US 2018/0131620 A1 May 10, 2018

(51) Int. Cl.
*H04L 29/06* (2006.01)
*H04L 12/851* (2013.01)
*H04L 29/12* (2006.01)
*H04L 12/859* (2013.01)

(52) U.S. Cl.
CPC ...... *H04L 47/2441* (2013.01); *H04L 47/2483* (2013.01); *H04L 61/15* (2013.01); *H04L 47/2475* (2013.01); *H04L 69/16* (2013.01)

(58) Field of Classification Search
CPC ............. H04L 47/2441; H04L 47/2483; H04L 47/2475; H04L 61/15; H04L 69/16
See application file for complete search history.

(56) References Cited

U.S. PATENT DOCUMENTS

| | | | |
|---|---|---|---|
| 6,259,690 B1* | 7/2001 | Yoshizawa | H04L 47/10 370/351 |
| 7,944,822 B1 | 5/2011 | Nucci | |
| 8,019,764 B1 | 9/2011 | Nucci | |
| 8,180,916 B1 | 5/2012 | Nucci | |
| 8,694,630 B1 | 4/2014 | Keralapura | |
| 8,819,227 B1 | 8/2014 | Keralapura | |
| 8,854,972 B1* | 10/2014 | Li | H04L 47/12 370/235 |
| 9,639,717 B2* | 5/2017 | Moskowitz | G06Q 30/0601 |
| 2004/0032872 A1* | 2/2004 | Dhara | H04L 47/10 370/401 |
| 2004/0054924 A1* | 3/2004 | Chuah | H04L 47/10 726/22 |
| 2005/0060295 A1* | 3/2005 | Gould | H04L 41/0896 |

(Continued)

OTHER PUBLICATIONS

Laurent Bernaille, Traffic Classification on the Fly; ACM SIGCOMM Computer Communication Review, vol. 36, No. 2, Apr. 2006.

(Continued)

*Primary Examiner* — Min Jung
(74) *Attorney, Agent, or Firm* — Sheppard, Mullin, Richter & Hampton LLP

(57) ABSTRACT

Methods and systems of history-based instantaneous QoS class classification of traffic flow. QoS classifications are mapped to target destinations such that, when a first flow parcket packet of a traffic flow requesting access to a resource associated with the target destination, a classifier can instantaneously classify the traffic flow as belonging to a particular QoS class for servicing of the traffic flow.

19 Claims, 10 Drawing Sheets

(56) References Cited

U.S. PATENT DOCUMENTS

| | | | |
|---|---|---|---|
| 2007/0083924 A1* | 4/2007 | Lu ..................... | H04L 63/0227 726/13 |
| 2010/0014420 A1* | 1/2010 | Wang ................... | H04L 41/142 370/229 |
| 2012/0144025 A1* | 6/2012 | Melander ............ | H04L 47/2441 709/224 |
| 2014/0351106 A1* | 11/2014 | Furr .................... | G06Q 20/145 705/34 |

OTHER PUBLICATIONS

Ignacio Bermudez et al; DNS to the Rescue: Discerning Content and Services in a Tangled Web; pp. 1-14; Nov. 14, 2012.

Trestian et al; Unconstrained Endpoint Profiling (Googling the Internet), Sigcomm'08, Aug. 1-22, 2008, 12 pages.

Luigi Grimaudo et al; SeLect: Self-Learning Classifier for Internet Traffic; Manuscript received Jun. 10, 2013; revised Dec. 20, 2013; 14 pages.

Alok Tongaonkar et al; SANTaClass: A Self Adaptive Network Traffic Classification System; Narus Inc; USA; 9 pages; 2013.

Guowu Xie; "Towards Practical Flow-Level Traffic Classification", University of California Riverside; Narus, Inc. The 31st Annual IEEE International Conference on Computer Communications: Min-Conference; 2012.

Sandvine Intelleigent Broadband Networks; Spotlight: Encrypted Internet Traffic; 2016 Global Internet Phenomena; sandvine.com; 10 pages.

Levenshtein Distance—Wikipedia; htpps://en.wikipedia.org/wiki/Levenshtein_distance; Mar. 27, 2018; 5 pages.

Digital Celullar Telecommunications System (Phase 2+); Universal Mobile Telecommunications System (UMTS); LTE; Duality of Service (QoS) concept and architecture (3GPP TS 23.107 version 13.0.0 Release 13) ETSI TS 132 107 V.13.0.0 (Jan. 2016), 44 pages.

Donald R. Morrison; "Patricia; Practical Agorith to Retrieve Information Coded in Alphanumeric", vol. 15, Issue 4, Oct. 1968 ; pp. 14-534.

Matthew Roughan, Class-of-Service Mapping for QoS: A Statistical Signature-based Approach to IP Traffic Classification; Schol of Mathematical Sciences, Oct. 25-27, 2004, 14 pages.

International Search Report and Written Opinion for PCT/US2017/061007 dated Feb. 9 2018, 17 pages.

Pawel Foremski et al: "DNS-Class: Immediate Classification of IP Flows Using DNS", International Journal of Network Management, vol. 24, No. 4, Jun. 5, 204 (Jun. 5, 2014), pp. 272288.

Wang Pu et al: "A Framework for QoS-aware Traffic Classification Using Semi-Supervised Machine Learning in SDNs", 2016 IEEE International Conference on Services Computing (SCC), IEEE, Jun. 27, 2016 (Jun. 27, 2016), pp. 760-765.

* cited by examiner

HISTORY-BASED CLASSIFICATION OF TRAFFIC INTO QOS CLASS WITH SELF-UPDATE

TECHNICAL FIELD

The disclosed technology relates generally to network traffic management, and more particularly, some embodiments relate to history-based classification of traffic into a quality of service ("QoS") class.

DESCRIPTION OF THE RELATED ART

Network traffic from more and more applications are sharing common network resources within today's broadband packet-switched networks. During peak hours (i.e., busy hours when most subscribers are simultaneously online), network resources may become limited. However, not all traffic is created equal; different network traffic may have different quality of service ("QoS") requirements that must be met. The traffic must be provisioned correctly within the network to ensure that the specific QoS requirements of the traffic are met. That is, the traffic must be classified into different traffic types such that the traffic can be placed into the proper queue for servicing by a scheduler.

Traditionally, destination server port numbers are used to classify traffic. For example, TCP port 80 is for HTTP traffic, TCP port 25 is for SMTP traffic, and so on. In recent years, more and more traffic is using a few popular port numbers such as TCP port 80 and TCP port 443, to avoid being blocked by firewalls and Internet Service Providers ("ISPs"). As a result, port numbers no longer carry useful information about application and traffic type and it is not possible to achieve meaningful classification of traffic using port numbers.

Several prior approaches to port-based classification have been proposed. One such approach is known as Deep Packet Inspection ("DPI"). DPI classifies traffic by constructing application signatures for traffic by inspecting the content of packets in the flow. A method of DPI, known as Self Adaptive Network Traffic Classification ("SANTaClass"), uses a signature generation algorithm installed in a network that identifies application signatures through identification of invariant patterns within the packets. Classification of the traffic is then conducted utilizing the generated application signature, in combination with the domain name and DNS response. DPI requires tedious manual reverse engineering of protocols in order to generate application signatures.

Another approach classifies traffic utilizing machine learning to perform a traffic statistics-based classification. These machine learning approaches can be grouped into two categories: supervised and semi-supervised. Both approaches require a set of known flows to train or bootstrap the traffic classifier within the network, and this training data is usually generated through a tedious process. For supervised approaches, the machine learning is trained to distinguish flows among a predefined set of applications. It is often very hard to know all applications a priori and train for them; the classification performance degrades significantly when new applications emerge or existing applications evolve. Semi-supervised approaches address the degradation utilizing clustering techniques; instead of learning to distinguish individual applications from one another, similar applications are grouped together and identified as belonging to a cluster. Both categories of traffic-statistics based machine learning approaches perform classification based on packet size and inter-arrival time of the first six packets of a flow. U.S. Pat. No. 8,694,630 describes a semi-supervised approached that automatically groups payloads into clusters to be identified and labeled. Before classification can occur, several packets at the beginning of the flow need to be examined. These packets that must be examined excludes the TCP three-way handshake and TLS handshakes for applications that run over TLS over TCP. Moreover, the flows are classified into particular applications, not QoS classes.

Another approach classifies traffic utilizing keywords. U.S. Pat. No. 8,819,227 illustrates such a prior art approach. When an application tries to access a resource, the address of the resource is usually a fully qualified domain name ("FQDN"). To send an IP packet to the server, the FQDN needs to be translated to an IP address. The translation from FQDN to IP address is done by sending a DNS query to a DNS server which responds with a DNS response. DNS response carries the IP address which corresponds to the FQDN being queried. DNS response also includes a copy of the DNS query which has the FQDN. DNS query/response needs to happen before the TCP SYN packet (the first packet of a TCP traffic flow) can be sent for a TCP-based application. Based on the keywords extracted from the FQDN, a flow can be classified into an application type when the flow starts, but not into a QoS class. In some cases, however, the listing of keywords may be incomplete, leading to incorrect classifications.

All the current approaches suffer from delays in the ability to instantaneously classify traffic flows into associated QoS classes to ensure efficient servicing of traffic flows based on QoS requirements. The prior approaches require some amount of inspection of content packets of the flow before a classification can occur. Moreover, because some amount of inspection of content packets is required, the approaches do not work effectively for encrypted traffic, which limits the amount of inspection that can occur.

BRIEF SUMMARY OF EMBODIMENTS

According to various embodiments of the disclosed technology, network traffic is classified instantaneously based on actual measure traffic characteristics. The traffic is classified instantaneously when a flow starts, namely, when the first flow packet is received. Where the traffic is TCP traffic, the first flow packet may be the TCP SYN packet. Where the traffic is UDP traffic, the first flow packet may be the first packet of the flow. In various embodiments, the classification is based on the history which is updated when the traffic flow is completed. The classification type may be updated during a flow when the classification type from the history does not match measured traffic characteristics. When there is no exact history of the flow, various embodiments may make use of all available information in the history to recommend a classification type. The traffic is classified into QoS classes which are used to prioritize traffic to allocate resources (e.g., bandwidth, buffer, etc.) when the traffic demand approaches the capacity of the communication link.

According to an embodiment of the disclosed technology, a method of traffic classification is provided, comprising receiving, at a traffic classifier, a first flow packet of a current traffic flow; identifying a target destination of the current traffic flow based on the first flow packet; checking a history, wherein the history associates a plurality of target destinations with an associated classification type; and tagging the current traffic flow to the classification type associated with the target destination, wherein the classification type comprises one of a plurality of quality of service "QoS" classes having one or more QoS requirements.

According to an embodiment of the disclosed technology, an instantaneous traffic classification system is provided, comprising: a traffic classifier comprising a history comprising one or more lookup tables mapping a target destination to a classification type of one or more classification types; and one or more queues configured to store a plurality of traffic flows, each queue associated with each classification type of the one or more classification types; wherein the traffic classifier is configured to classify a current traffic flow as a classification type of the one or more classification types before any content packets of the current traffic flow are transmitted.

According to an embodiment of the disclosed technology, a method of updating a history for a history-based traffic classification system, comprising: determining a flow information set for a Fully Qualified Domain Name ("FQDN") of a plurality of FQDNs, wherein the flow information set includes a flow object for each traffic flow associated with each FQDN, each flow object identifying a flow classification type and one or more weights; determining a total weight associated with each flow classification type present in the flow information set; determining an overall total weight comprising the sum of all weights present in the flow information set; determining normalized weights for each flow classification type present in the flow information set; determining a maximum normalized weight from a set of normalized weights; comparing the maximum normalized weight against a threshold value; if the maximum normalized weight exceeds the threshold value, setting the flow classification type associated with the maximum normalized weight as a classification type for the FQDN; and updating a history to identify the FQDN as associated with the set classification type for the FQDN.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Applications with different QoS requirements share common network resources in today's packet-switched networks. These network resources may become limited at busy hours of the day, when most subscribers are simultaneously online. Without proper provisioning of different application-based services based on the QoS requirements of each application, for example, IP packets from an interactive application (e.g., an online banking application) may get stuck behind a large number of packets from a bulk application (e.g., a large file download). As a result, the user of the interactive application will experience a very large delay, impacting perceived service quality of the network provider. Throughout this disclosure, the term "flow" is defined as a bidirectional flow. Unless otherwise noted, the terms "flow" and "connection" are used interchangeably throughout this disclosure to represent a bidirectional flow.

One solution to the problems identified above is to prioritize traffic according to the QoS requirements of the different traffic flows. To enable prioritization of different traffic flows, each flow needs to be classified into different QoS classes, put into queues associated with each QoS class, and serviced according to the QoS requirements of the different QoS classes.

Figure 1:
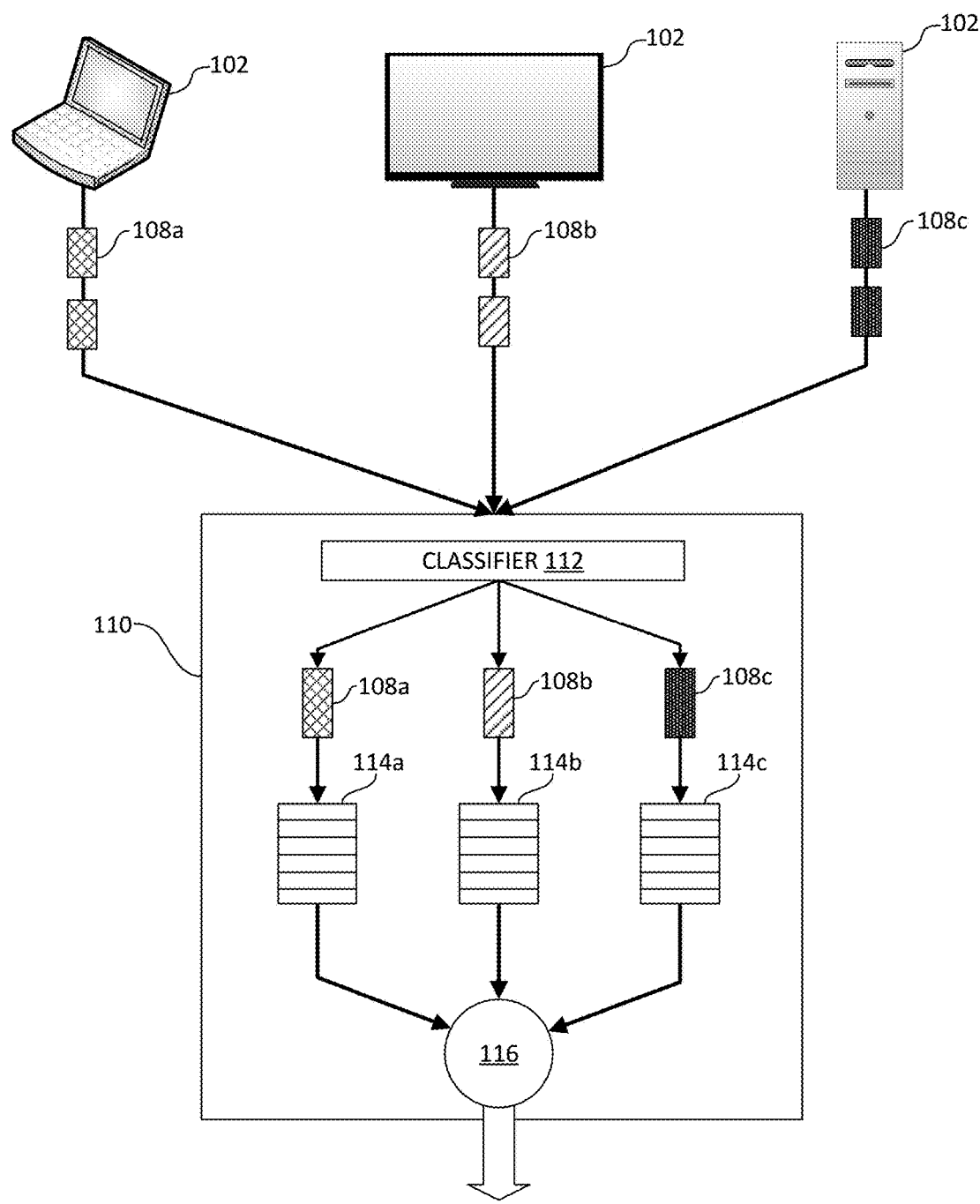
FIG. 1 illustrates an example environment within which embodiments of the technology disclosed herein may be implemented.

Before describing the technology disclosed herein in greater detail, it is helpful to describe how networks service traffic flows based on QoS requirements. FIG. 1 illustrates an example environment 100 within which embodiments of the technology disclosed herein may be implemented. The example environment 100 represents a communications network managed by an Internet Service Provider ("ISP"), providing Internet connectivity to subscribers. Subscribers may connect multiple client devices 102 to the Internet through one or more connection devices 110. Non-limiting examples of client devices 102 may include: laptops; desktops; Internet-capable televisions; multimedia streaming devices (e.g., Apple TV®; Roku®; Amazon Fire TV®, etc.); tablets; smartphones; networked appliances (e.g., "smart" appliances); local servers and/or data repositories; or other Internet-capable devices. Non-limiting examples of connection devices 110 include: consumer premise equipment ("CPE") (e.g., cable modem/router; DSL modem/router; fiber-optic modem/router; etc.) that is located at the user's premises; network devices located within the network with an interface to a bottleneck link; or network devices located at gateway locations with an interface to a bottleneck link (e.g., a network device at a satellite gateway with an interface to a satellite link shared among satellite user's terminals); or any other device with a set of queues 114a, 114b, 114c, a scheduler 116, and a classifier 112.

The example environment 100 is provided as an illustration, and is not intended to represent the actual infrastructure of a communications network. In various embodiments, the client devices 102 may co-located or associated with the same subscriber. In other embodiments, the client devices 102 may be associated with different subscribers that are geographically dispersed within the communications network. In various embodiments, the connection device 110 may be a router within a subscriber's home, or a network device associated with a gateway servicing multiple subscribers. The illustration is meant for ease of discussion, omitting excessive connections and unaffected network equipment.

Multiple client devices 102 may be utilizing applications to obtain services over the network at the same time. For example, within a network there may be flows associated with an online banking application 108a, a streaming video application 180b, and a file download application 108c. Requests to connect over the network are received by the connection device 110, located within the network or at a consumer's premise. The connection device 110 includes a classifier 112, which classifies application flows into different QoS classes, associated with the type of application, and assigns the classified flows into queues 114a, 114b, 114c associated with the QoS classes.

The number and definition of QoS classes may vary depending on the network specifications. One example of QoS classes is included within the UMTS standard in "Quality of Service (QoS) concept and architecture," 3GPP TS 23.107. The UMTS specification defines four types of QoS classes: conversational; streaming; interactive; background (or "bulk"). An example flow that would fall in the conversational class is a voice call, which requires low delay and low jitter. An example flow that would fall in the streaming class is multimedia streaming, which requires medium delay and medium jitter. An example flow that would fall in the interactive class is web browsing, which requires low round trip time ("RTT"). An example flow that would fall in the background, or bulk, class is a file download, which is insensitive to delivery time.

In the illustrated example of FIG. 1, the different application flows are classified by the classifier 112 into corresponding QoS classes. For example, a flow associated with an online banking application 108a is classified as an interactive flow and assigned to the interactive class queue 114a, a flow associated with a streaming application 108b is classified as a streaming flow and assigned to the streaming queue 114b, and a flow associated with a file download 108c is classified as a bulk flow and assigned to the bulk queue 114c. The scheduler 116 schedules servicing of the different flows based on the QoS requirements of the different QoS classes, ensuring that application flows classified into a QoS class with higher QoS requirements is prioritized to ensure that network resources are efficiently allocated.

Figure 2:
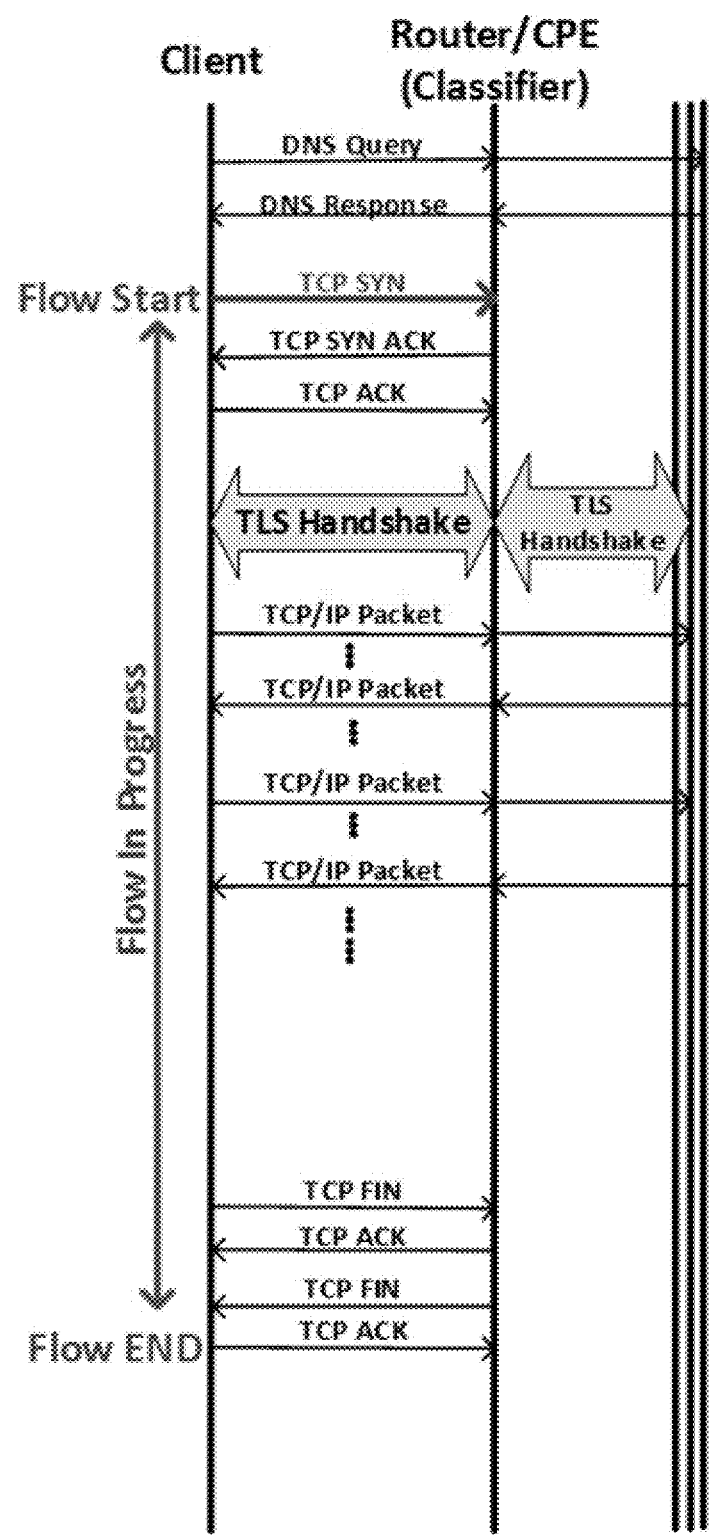
FIG. 2 illustrates an example message flow representing a flow transported within an example environment.

All flows share the same basic structure. FIG. 2 illustrates an example message flow 200 representing a flow transported within a network, similar to the network 100 discussed with respect to FIG. 1. The example message flow 200 in FIG. 2 illustrates the messaging associated with an application running over TLS over TCP. For ease of discussion, embodiments of the technology disclosed herein are described in the context of TCP traffic. Although described with respect to TCP traffic, nothing in this disclosure should be interpreted to limit the technology disclosed herein only to TCP traffic. A person of ordinary skill in the art would appreciate that the technology disclosed herein may be implemented for use with UDP traffic with minimal changes.

Web resources are almost all accessed via Fully Qualified Domain Name ("FQDN"). However, IP packets are sent to an IP address. In order to translate FQDN into a server IP address, a DNS query is sent to a DNS server which responds with a DNS response. The DNS response carries the server IP address (or addresses) which corresponds to the FQDN. After receiving the DNS response, a flow begins when a client 102 transmits a TCP SYN packet (the first packet of the flow).

Within the network 100, when a router or other CPE receives the TCP SYN packet, the CPE needs to decide immediately to which queue a flow should be assigned. Most current classifiers require a few number of packets to observe in order to determine the classification type of the flow. Therefore, the classifier may make an initial random assignment of a flow to a particular queue before determining the QoS class of the flow and, accordingly, the proper queue within which the flow should have been assigned. If the random assignment was incorrect, the flow may be required to be moved to a new queue associated with the correct QoS class of the flow. Moving the flow from one queue to another in the middle of a flow is not a trivial operation in practice and is not desirable. DPI and traffic statistics based classification approaches both require collection of sufficient amount of information regarding the flow before a classification can be made, meaning that an instantaneous classification at the beginning of a flow is not possible, potentially resulting in the need to reassign flows from one queue to another.

One approach to classifying flows instantaneously at the start of a flow is to utilize keyword-based classification using the FQDN. However, keyword-based approaches are not a reliable way of identifying the QoS class of a flow because FQDN of a flow may or may not include keywords precompiled ahead of time. Moreover, keywords associated with a QoS classification type may not be unique for all FQDNs and/or may change over time. To develop a complete dictionary of keywords which can classify all the FQDNs correctly is challenging and nearly infeasible.

Moreover, almost all the current classification approaches classify the traffic flows into an application or applications class first. That is, each flow is classified as belonging to a particular application or group of applications. In order to provision each flow according to the QoS requirements, the list of applications or application classes needs to be categorized into QoS classes, which is generally a manual process. Every time a new application appears, a human inspection is required to map the new application onto a QoS class.

Further, current approaches cannot be applied to encrypted traffic. All the current approaches require inspection of the content of a flow in order to classify the flow. However, packets inspection is not possible when the traffic is encrypted. The amount of encrypted traffic represents roughly 37.5% of all Internet traffic in 2016, and is could potentially reach as high as 70% of all Internet traffic in the near future. Due to the limitations of the prior classification approaches, efficient prioritization of flows within a network may become difficult to achieve.

Embodiments of the technology disclosed herein are directed towards devices and methods for classifying network traffic. More particularly, the various embodiments of the technology disclosed herein relate to a history-based classification approach that classifies network traffic into quality of service ("QoS") classes instantaneously at the start of a traffic flow. Instantaneous classification at the beginning of the flow avoids the drawbacks of current approaches discussed above. When the traffic is short, these prior approaches may not be able to classify the traffic until the flow as already completed because the prior approaches require several packets to observe before classification can occur. Classifying at the beginning of the flow ensures that traffic is classified and prioritized from the beginning, avoiding inefficient resource allocation. Utilizing the history-based traffic classification approach of the technology disclosed herein, effective classification is possible even when the traffic is encrypted, as classification can be done without having to examine any of the packets of the flow in order to determine the QoS class.

Figure 3:
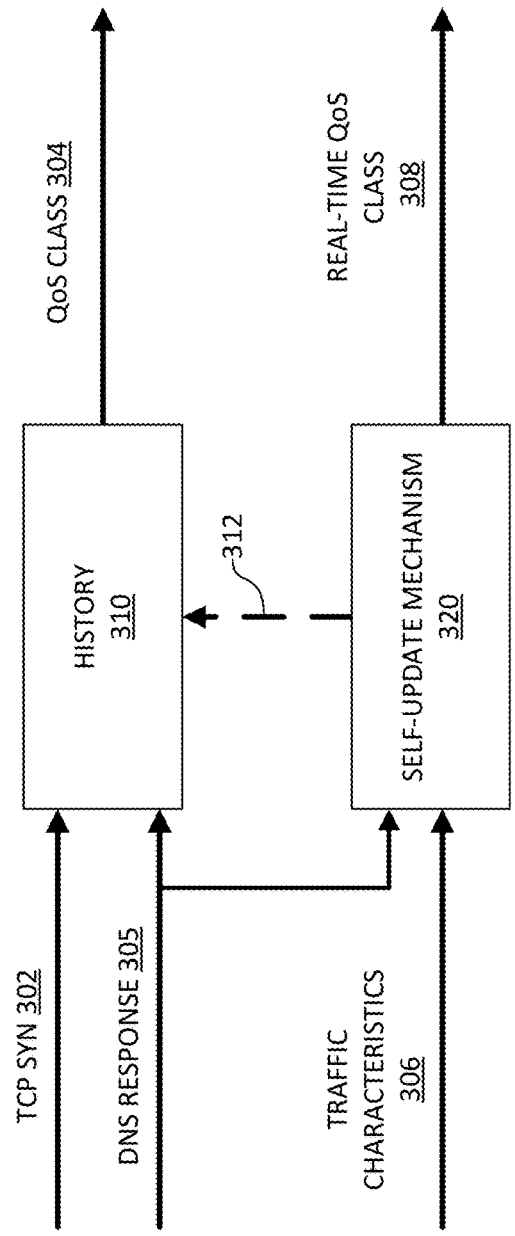
FIG. 3 illustrates an example history-based classification system in accordance with various embodiments of the technology disclosed herein.

FIG. 3 illustrates an example history-based classification system 300 in accordance with various embodiments of the technology disclosed herein. The history-based classification system 300 may be implemented within one or more devices within the network tasked with management of traffic flows, similar to the connection device 110 discussed with respect to FIG. 1. Unlike prior approaches, the history-based classification system 300 utilizes past decisions and characteristics of the flow to enable instantaneous assignment of a classification type, or QoS class, to the flow at the beginning of the flow, unlike prior approaches that require inspection or observation of some number of packets of the flow before a QoS class may be assigned. Moreover, as the classification is based on prior history of flows requesting access to the same or similar web resources, the classification system 300 is applicable to encrypted traffic, as classification is not dependent on access to content of packets that is not easily observable for encrypted traffic. For ease of discussion, embodiments of the technology disclosed herein will be discussed with respect to a single current traffic flow. Although discussed in such a manner, a person of ordinary skill in the art would appreciate that a plurality of traffic flows may be processed simultaneously by the classifier in a network device. Nothing in this disclosure should be interpreted as limiting the scope of the invention to serial processing of traffic flows.

As illustrated in FIG. 3, the history-based classification system 300 includes a history 310 and self-update mechanism 320. In various embodiments, the history 310 may include one or more lookup tables maintaining entries associating QoS classes to target destinations. A target destination is a destination server or servers hosting the web resource(s) to which a subscriber is requesting access. The history 310 enables traffic flows to be classified directly into a QoS class, unlike current approaches that classify flows according to applications that may have traffic flows of varying QoS classes, necessitating a more intensive analysis of flow packets to ultimately assign the flow to particular a QoS class.

The history-based classification system 300 also includes a self-update mechanism 320. In various embodiments, the self-update mechanism 320 is responsible for populating the history 310 based on the traffic characteristics 306 of flows. In some embodiments, the history 310 may be initially empty, and the self-update mechanism 320 is responsible for generating all the entries in the history 310. In other embodiments, the history 310 may be initially preset, and the self-update mechanism 320 may be responsible for updating the history 310 over time. When necessary, the self-update mechanism 320 may send an update message 312 to the history 310 to update the information maintained in the history 310, to reflect changes in the classification type (i.e., QoS class) of a target destination based on the traffic characteristics of a traffic flow communicating with the target destination. In various embodiments, the self-update mechanism 320 may update the history 310 after the traffic flow is finished.

In various embodiments, the self-update mechanism 320 may also perform a real-time classification to identify a real-time QoS class 308 for the traffic flow. Sometimes, the initial classification of the traffic flow based on the history 310 may be incorrect. In those cases, a flow may need to be re-classified and reassigned to a different QoS-associated queue. The self-update mechanism 320 may perform a flow classification process in real-time during the flow to determine whether the QoS class into which the flow is assigned need be changed, based on traffic characteristics 306 collected during the flow. In various embodiments, the self-update mechanism 320 may also utilize the DNS response 305. Based on the real-time classification, a real-time QoS class 308 may be output, which identifies the QoS class to which the flow should be assigned based on the current traffic characteristics. In some embodiments, the classifier may use the real-time QoS class 308 to reclassify the traffic flow and place it in a different QoS-associated queue. In various embodiments, the self-update mechanism 320 may perform continuous classification, or the self-update mechanism 320 may determine real-time classification periodically.

Changing the QoS class assignment during the flow is outside the scope of this disclosure.

The history-based classification system 300 enables instantaneous classification of a traffic flow into a QoS class because it performs the classification upon receipt of a TCP SYN packet 302. The TCP SYN packet 302 is the first packet of a flow, transmitted before any content packets because a TCP connection must be established before packets may be transmitted from client to source. The order of messages is illustrated in FIG. 2. The TCP SYN packet carries information regarding the flow: source IP address; source port number; destination IP address; destination port number; and the Layer 4 (i.e., transport layer) protocol. Using the TCP SYN 302 and the DNS response 305, the classifier is capable of identifying the traffic flow based on the history 310, and assign the flow to a QoS class 304.

Figure 4:
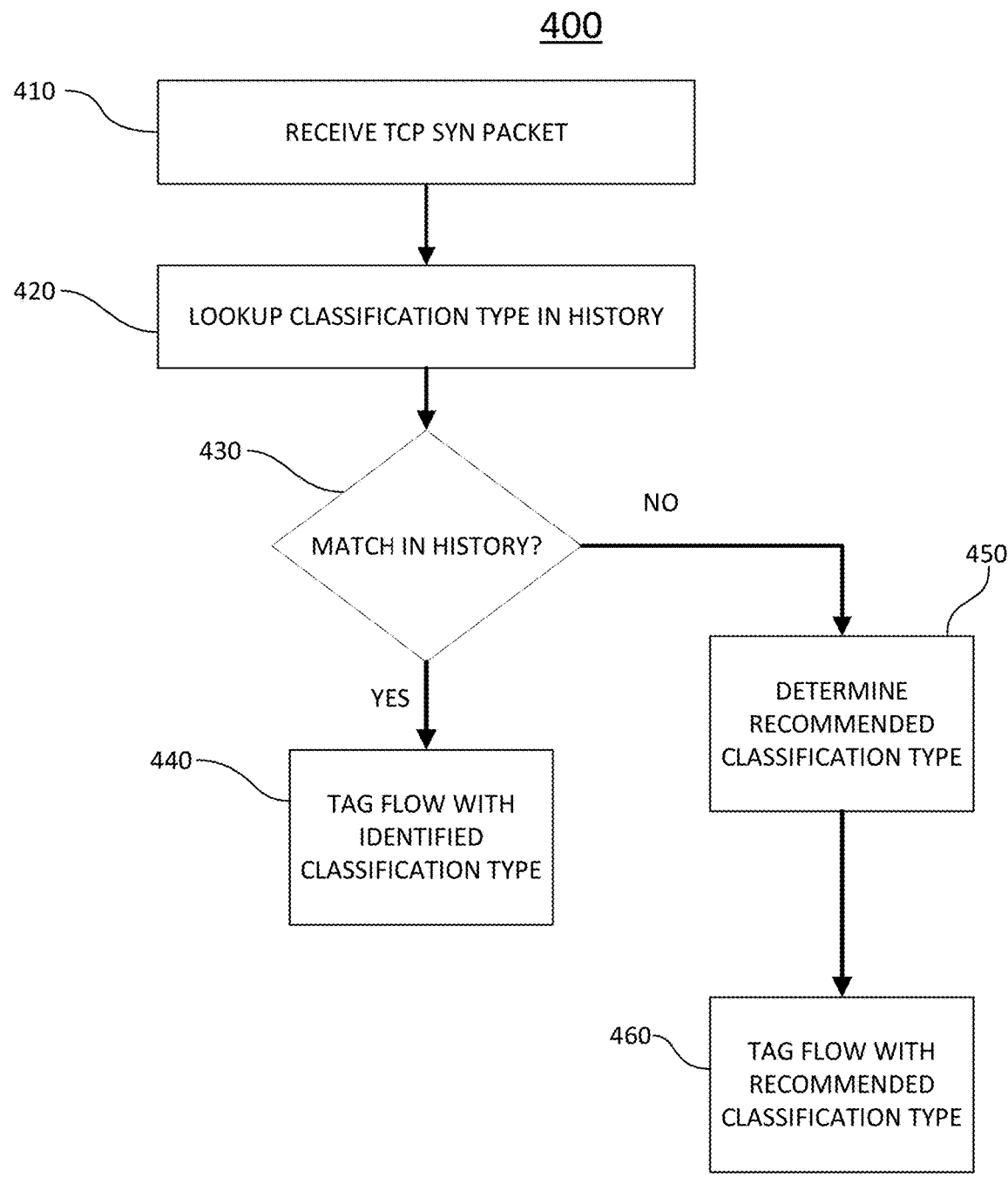
FIG. 4 illustrates an example QoS classification process in accordance with various embodiments of the technology disclosed herein.

FIG. 4 illustrates an example QoS classification process 400 in accordance with various embodiments of the technology disclosed herein. The example QoS classification process 400 may be implemented by a history-based classification system, such as the example system 300 discussed with respect to FIG. 3. Referring to FIG. 4, at 410, a TCP SYN packet is received by a device tasked with managing traffic flow on the network. As discussed above, the TCP SYN packet is the first packet of a flow. In embodiments implemented for use with UDP traffic, the first packet of the UDP flow may be used in the same manner as the TCP SYN packet. The device receiving the TCP SYN packet may be any device tasked with managing traffic flow, such as the types of devices/equipment discussed above with respect to FIGS. 1 and 3. A classifier within the device may implement the QoS classification process 400. In various embodiments implementing for use with UDP flows, the first packet of the UDP flow may be used in the same manner as the TCP SYN packet.

Upon receiving the TCP SYN packet, the classifier may then lookup the classification type of the flow in its history at 420. The classification type is the QoS class for the flow. In various embodiments, the lookup key for finding the classification type may be the Fully Qualified Domain Name ("FQDN"). A FQDN corresponds to a server IP address that can be found in the DNS response (i.e., the destination IP address). A "web resource" is anything which can be accessed by a user (e.g., through a browser or software) on the Internet. Every web resource is addressed by a FQDN, making it a reliable entity to use as the lookup key for history-based classification. Moreover, although web resources may be located on different servers having different IP addresses for load balancing and performance purposes (e.g., content delivery networks ("CDNs")), the same FQDN covers all the web resources hosted in such a manner. In various embodiments, the server (destination) IP address may be used as the lookup key. The server IP address and server port number are quite static and independent of the clients (source) connecting to the servers.

In various embodiments, the server port number may be utilized as a secondary key. Traffic of different classification types can be sent to the same server port number. By utilizing the server port number as a secondary key (in combination with either the FQDN or the server IP address as the primary key), two separate classification histories can be maintained, one for unencrypted traffic (i.e., http traffic) and one for encrypted traffic (e.g., https traffic), by using server port numbers. For example, the encrypted traffic history can be identified using port number 443 as a key, and the unencrypted traffic history can be identified using port number 80.

The size of the classification history depends on the number of destinations being accessed. In most networks, 95% of all traffic is targeted at 5% of destinations. Therefore, only a small number of destination FQDN and/or IP addresses are required to be stored in the history in order to classify the vast majority of the traffic. In various embodiments, the history may be larger when utilizing IP addresses as the lookup key because there may be several IP addresses corresponding to a single FQDN for a CDN, with each IP address having to be included in the history. The size of the history may also depend on the location of the history-based classification system. For example, if the history-based classification system is implemented in a CPE, the size of the history may depend on the number of users in the customer's location, as well as the usage behavior of the users. As another example, if the history-based classification system is implemented in a device at a gateway, the size of the history may depend on the size required for each user connecting through the gateway, as well as the total number of user's serviced by the gateway.

Referring back to FIG. 4, if a match is found within the history at 430, the classifier can tag the flow with the classification type (i.e., QoS class) in the history at 440. As discussed above with respect to FIG. 1, each QoS class may have an associated queue for servicing of the flows. The assignment of the flow to a queue occurs prior to any data packets being sent by the client device. Accordingly, the flow is classified into a QoS class prior to any packets being sent, allowing for instantaneous classification at the beginning of the flow.

For ease of discussion, the operation of the history-based classification system shall be discussed with reference to a system utilizing FQDN as the key for determining the proper QoS class. A person of ordinary skill would appreciate that the operation discussed is applicable to embodiments where the destination IP address is used as the lookup key, and nothing in this disclosure should be interpreted as limiting the scope of the invention to a particular lookup key.

Figure 5:
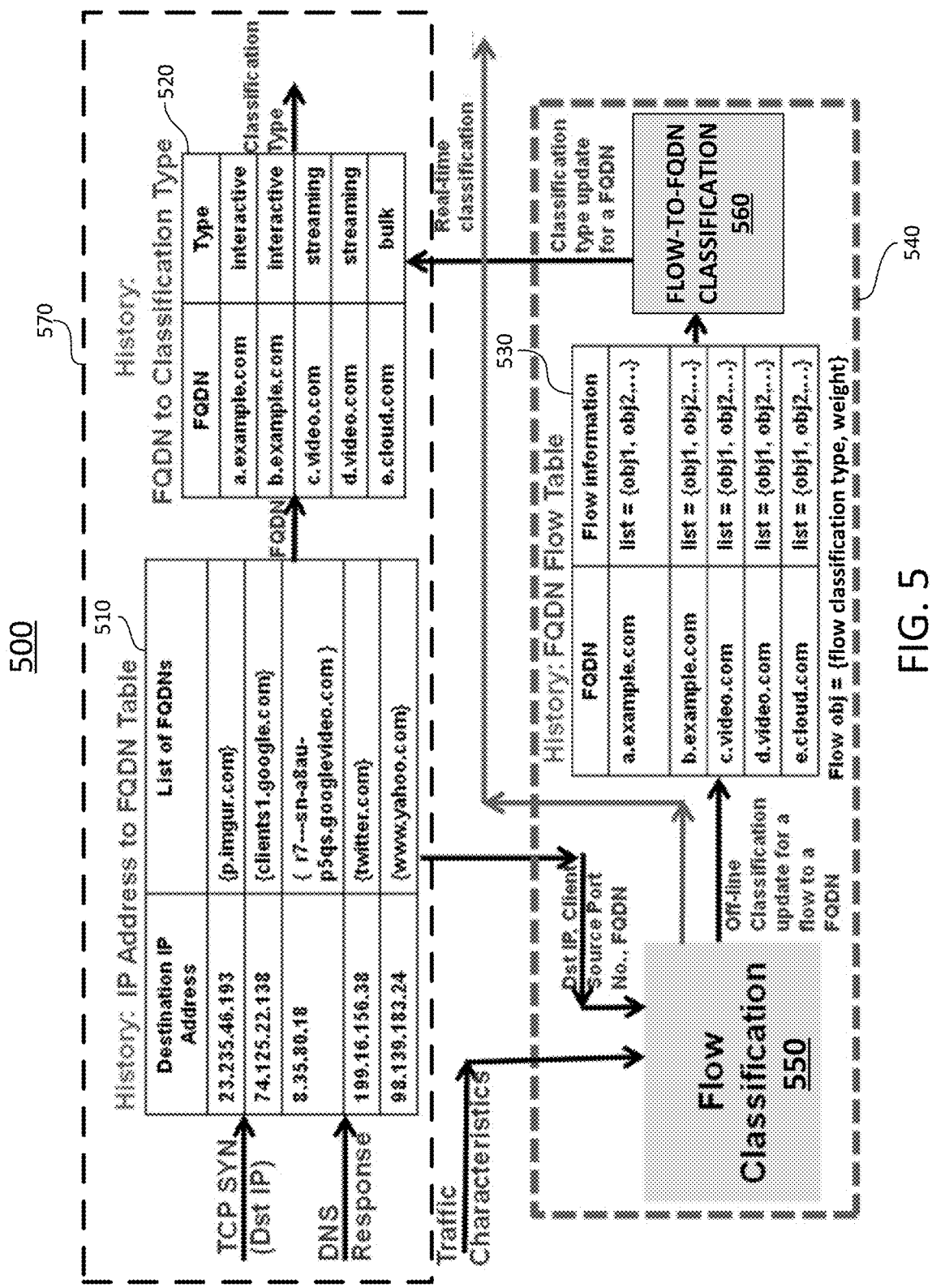
FIG. 5 illustrates an example history-based classification system utilizing FQDN as the lookup key, in accordance with various embodiments of the technology disclosed herein.

FIG. 5 illustrates an example history-based classification system 500 utilizing FQDN as the lookup key, in accordance with various embodiments of the technology disclosed herein. FIG. 5 illustrates the two operations of the history-based classification system 500: (1) traffic classification using history; and (2) updating the history. In the illustrated embodiment, the traffic classification operation 570 includes a first lookup table 510 and a second lookup table 520. In various embodiments, the tables 510 and 520 may be combined into a single lookup table. In other embodiments, only one lookup table may be required. The first lookup table 510 maintains a listing of destination IP address (i.e., target destinations) and their associated FQDNs. The first lookup table 510 may be generated based on TCP SYN packets and DNS responses received over time to build a history of mapping from IP addresses to FQDNs. A DNS response carries a copy of the corresponding DNS query and one or more IP addresses. In some embodiments, the DNS response may further carry one or more canonical name records ("CNAMEs"). The one or more IP addresses may be provided for one FQDN to represent CDN servers. One entry is added for each IP address to map the IP address to the FQDN. In various embodiments, there may be more than one FQDN for a single IP address; therefore, a listing of FQDNs may be constructed for each IP address.

In various embodiments, a storage limit may be placed on the number of IP addresses stored in the first lookup table 510. When the limit is reached, one or more existing IP addresses may be replaced within one or more new IP addresses. In some embodiments, the replacement may be made based on the concept of "least frequently used replacement" ("LFU"). The classifier and/or another component of the device tasked with managing traffic flow may record the frequency of usages of IP addresses as they are being accessed. Existing IP addresses with least frequency are replaced with new IP addresses when there is no more space for use. Another method of limiting storage is to implement a "least recently used replacement" ("LRU") scheme. Under LRU, the newest IP addresses are appended at the top of the first lookup table 510, pushing the least recently accessed IP addresses down the first lookup table 510. When the first lookup table 510 is filled, the existing IP address in the last row of the table 510 is removed, and a new IP address is added to the top of the first lookup table 510. Another method of limiting storage is to implement an age-based replacement scheme. In various embodiments, the age-based replacement scheme may replace the oldest entry in the list when a new entry is to be added.

In addition to putting a size limit on the first lookup table 510, and age limit may be placed on entries in the first lookup table 510 to avoid stagnant and outdated IP addresses and FQDNs from remaining in the history. For example, in some embodiments the first lookup table 510 may place an age limit on IP addresses remaining in the table to purge outdated IP addresses that may no longer be associated with the FQDNs. The classifier can obtain Time To Live ("TTL") information from the DNS response to use in determining whether stale entries in the history meet a threshold age and should be removed.

The second lookup table 520 maintains a mapping of FQDN to a QoS class associated with the flow. For example, the FQDN "a.example.com" is mapped onto the interactive class, and therefore is assigned to the interactive class queue and serviced to ensure that the QoS requirements for the interactive class are met. In embodiments where the IP address is utilized as the lookup key, table 510 may be omitted, with table 520 maintaining the mapping of IP addresses to classification types (i.e., QoS classes). The size limitation schemes discussed above with respect to table 510 may be applied equally to table 520 in various embodiments.

It is common that a subscriber access pattern is quite constant and a subscriber is accessing the same resources over and over again. For example, a subscriber may read the same news website almost every day, visit the same social media service, or stream multimedia through the same application. Therefore, in most cases the history can store and maintain the mappings of FQDNs to classification types for these often accessed resources in the history, enabling the classifier to simply find the matching entry in the table 520 and classify the flow. That is, in most cases, the example process 400 discussed with respect to FIG. 4 will usually proceed through from 410 to 440.

However, in some cases the subscriber might be accessing a resource that has not previously been accessed, or a mapping entry may have been removed due to age or other size limitation scheme (such as the limitations schemes discussed above with respect to table 510). In such cases, the classifier will not find an exact match at 430 in the example process 400 discussed with respect to FIG. 4. Where no exact match is found in the history, the classifier can make a recommendation on the QoS class to which to assign the flow based on information which is available in the history and can be related to the FQDN of the current, unmatched flow. With respect to FIG. 4, in such situations the example process 400 will proceed to 450 and 460 to determine a recommended classification type for instantaneous classification.

At 450, the classifier makes a determination of a recommended classification type. The classifier may employ one or more different schemes to determine a recommended classification type. In various embodiments, the classifier may use a similarity-based recommendation scheme. With a similarity-based approach, the objective is to find a FQDN in the history that is "most similar" to the FQDN of the current flow, and apply the classification type of the "most similar" FQDN to the current flow. Sometimes the same web resource is made available at more than one FQDN for load balancing purposes and for improving web page load time.

Finding the "most similar" FQDN can be considered finding a longest "postfix" in a tree data structure with subdomains of a FQDN. For example, if "a.b.c.d" is a FQDN, than "a," "b," "c," and "d" are subdomains of the FQDN. Assuming that "a.b.c.d" is not within the history, the other FQDNs in the history may be searched to find the longest postfix string. Referring to FIG. 5, assume that the history table 520 contains entries for: i) "e.f.c.d"; ii) "g.h.i.d"; iii) "i.b.c.d"; and iv) "j.b.c.d". In this history, the longest postfix matched to the current flow FQDN of "a.b.c.d" is "b.c.d". If only one entry in the table 520 contains the longest matching postfix, the classifier can apply the classification type of the corresponding FQDN in the table 520 to the current flow FQDN. If more than one entry in table 520 includes the matched longest postfix, a child with the closest match can be selected. In the present example, the string of subdomain "a" is compared to those of subdomains "i" and "j", and the closest string is the one that is selected. In various embodiments, different string comparison methods may be used to perform the comparison, including but not limited to: Hamming distance; Jaro-Winkler distance; Jaccard similarity or coefficient; Hellinger distance; Tversky index; Sørensen-Dice coefficient; or other string metrics. In some embodiments, Levenshtein distance may be used to evaluate the string similarity between the subdomains.

Figure 6:
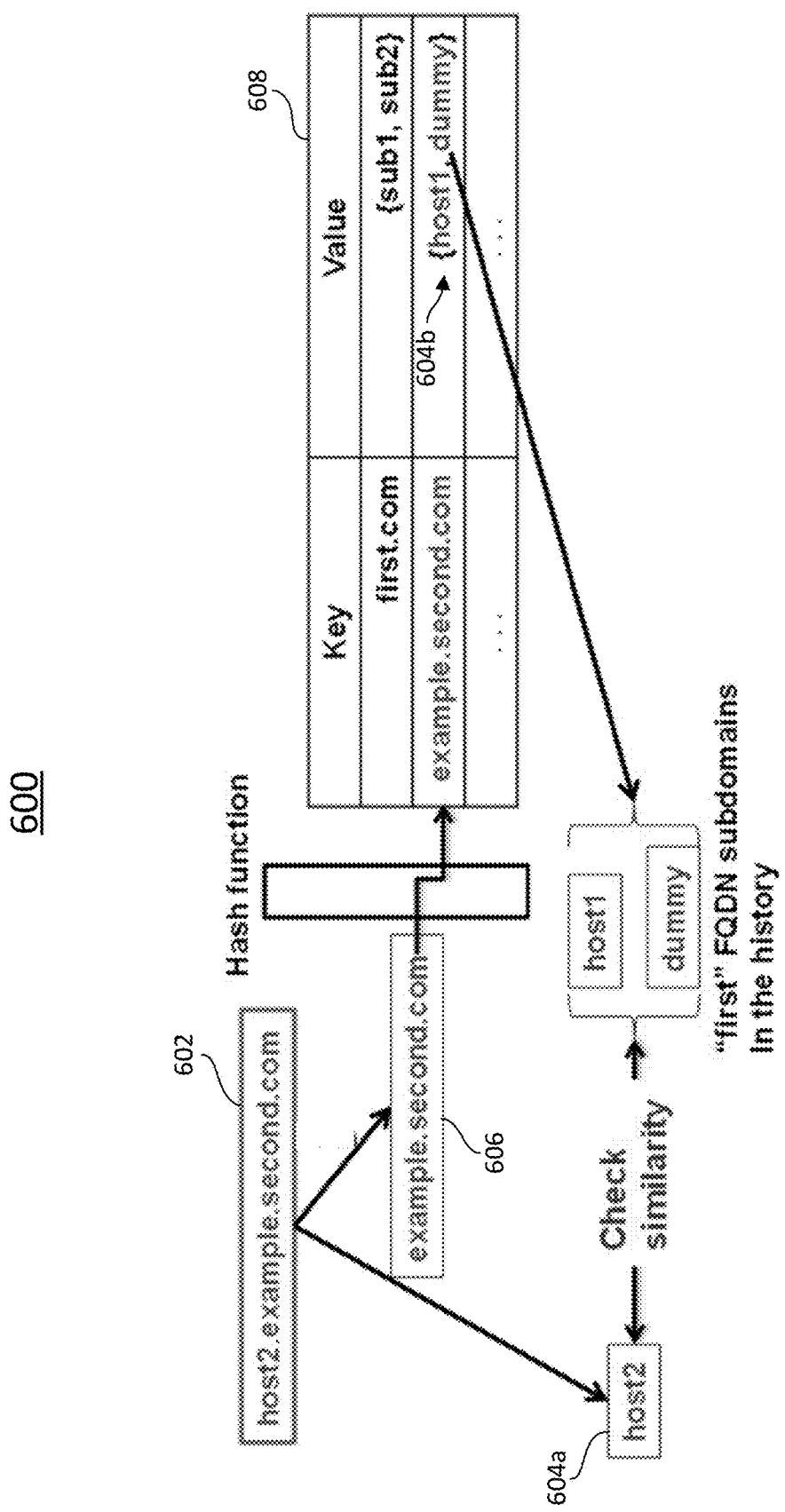
FIG. 6 illustrates an example less expensive "most similar" scheme in accordance with various embodiments of the technology disclosed herein.

Comparing the whole FQDN of the current flow to all the FQDNs stored in the history may be expensive, since the length of the FQDN may be long and the number of FQDNs in the table 520 may be large. FIG. 6 illustrates an example less expensive "most similar" scheme 600 in accordance with various embodiments of the technology disclosed herein. As illustrated in the example scheme 600, a new FQDN 602 is decomposed into two parts: a first subdomain 604*a*; and a parent domain 606. The classifier constructs a lookup table 608 with the parent domain 606 as the lookup key. The parent domain 606 may have more than one first subdomain 604 associated with it. Accordingly, the lookup table 608 may include a listing of first subdomains 604 associated with the parent domain 606. In the illustrated example, the lookup table 608 provides a first subdomain 604*b*, which is associated with the parent domain 608 but different from the first subdomain 604*a* identified from the new FQDN 602. To perform the "most similar" analysis, the classifier would identify the parent domain 606, search the lookup table 608 for the entry identifying all known first subdomains 604*b* previously discovered for the parent domain 606, and compare the known first subdomain 604*b* with the first subdomain 604*a* decomposed from the new FQDN 602. In various embodiments, Levenshtein distance may be performed to determine string similarity.

Comparing against a list of first subdomains of a parent domain that matches the parent domain of the current flow reduces the complexity of the string comparison operation. That is, the complexity of the string comparison operation becomes O(m.c.d), where m is the number of first subdomains in the list of a parent domain, c is the string length of the first subdomain of the current flow, and d is the string length of a first subdomain in the list maintained in the lookup table. In various embodiments, the lookup table 608 may be updated such that the list of subdomains for a parent domain 606 is updated to include the first subdomain 604*a* of the new FQDN 602.

Where there is only one first subdomain 604*b* with minimum Levenshtein distance, the classification type of that FQDN with the first subdomain 604*b* and the parent domain 606 is the recommended classification type for the new FQDN 602. Where there are more than one first subdomain 604*b* with minimum Levenshtein distance, if all the first subdomains 604*b* have the same classification type then the common classification type is the recommended classification type for the new FQDN 602.

If the more than one first subdomains 604*b* have different classification types, the recommended classification type for the new FQDN 602 is the most frequent classification type of the first subdomains 604*b*. In various embodiments, the most frequent classification type may be determined through deterministic selection or random selection. With deterministic selection, the classification type most that appears most often in the listing of first subdomains 604*b* with minimum Levenshtein distance. With random selection, the classification types of weighted and a selection is made at random. For example, assume that the following three first subdomains 604*b* have minimum Levenshtein distance: ("abc", "interactive"); ("abd", "streaming"); and ("abe", "interactive"). Under a deterministic scheme, the most frequent classification would be determined as "interactive," because it appears the most within the set of first subdomains 604*b*. Under a random scheme, the classifications "interactive" and "streaming" are randomly selected with a probability of ⅔ and ⅓, respectively.

Referring to FIG. 4, in various embodiments the classifier may utilize a keyword-based recommendation scheme at 450. A dictionary of keywords for each QoS class can be pre-compiled and used to search in the FQDN of the current flow. For example, "r1-sn-a8au-p5qz.examplevideo.com" and "fbcdn-video.a.abcdehd.net" are example video streaming hosts and their FQDNs have the keyword "video" included. Any accepted substring search algorithm may be used to search for keywords within the FQDNs. In various embodiments, the substring search algorithm may be the Knuth-Morris-Pratt ("KMP") algorithm or the Boyer-Moore ("BM") algorithm.

Another recommendation scheme that may be employed at 450 is a popularity-based scheme. A popularity-based scheme leverages the frequency of classification types associated with traffic passing through the CPE or network device. For example, the classifier may notice that 70% of all traffic is "interactive", 20% "streaming", and 10% "bulk." Using a deterministic approach, the popularity-based scheme would classify the new FQDN as "interactive", while under a random approach the classification type would be selected with probability of 70%, 20%, and 10%, respectively.

In various embodiments, one or more recommendation schemes may be implemented at 450 to provide a recommended classification where no exact match is present in the history. In some embodiments, all three recommendation schemes may be utilized, with the schemes ranked according to preference. For example, in various embodiments, when no exact match is found in the history, the classifier may attempt to recommend a classification using a similarity-based scheme. If no match of longest postfix or parent domain exists, the classifier may attempt instead to determine a recommended classification using a keyword-based scheme. If no recommended classification is determined using the keyword-based scheme, the classifier may then resort to a popularity based scheme. In various embodiments, the order of preference of the schemes may change, based on the preferences of the network operator.

After the classifier determines a recommended classification type, the classifier may then tag the flow with the recommended classification type at 460. The tagging at 460 is similar to the tagging at 440, except that the tag is based on a recommended classification type as opposed to a history-based classification type. Once tagged as belonging to a particular QoS class, the flow may then be assigned to a particular queue associated with that QoS class for servicing.

As discussed above, the history-based classification system disclosed herein utilizes the history associated with a traffic flow to enable instantaneous classification into a QoS class at the beginning of a flow, without the need to perform any inspection of packets within the flow. By classifying flows at the outset of the flow into a QoS class, embodiments of the present disclosure alleviate many of the drawbacks associated with current approaches to traffic classification, which require some number of packets to be transmitted before a classification can be made. In this way, the instances of misclassification can be reduced. Moreover, the history-based classification system may be applied to both unencrypted and encrypted traffic because the system does not require any packet inspection to make a classification. Current approaches are not equally applicable to encrypted traffic because, since the traffic is encrypted, the current approaches are unable to inspect the content and, therefore, do not have access to the information necessary to make a determination. Various embodiments of the present disclosure avoid this issue because the classification is made at the time of TCP SYN, utilizing prior history to assign a QoS class, without the need to inspect any packets of the flow.

In order to implement the history-based classification system, the history to be used must be generated and updated to allow for accurate classifications of flows. Referring back to FIG. 5, the self-update mechanism 540 is responsible for performing this second operation of the example system 500: updating the history. As illustrated, the self-update mechanism 540 includes a flow classification component 550. The flow classification component 550 utilizes traffic conditions and information from DNS responses to generate flow characterizations for traffic flows directed at the FQDNs. In various embodiments, the flow classification component 550 may perform real-time classification, as discussed with respect to FIG. 3. Real-time classification may determine a QoS class classification of the current traffic flow based on the traffic characteristics, as opposed to relying on past history information, and can enable a flow to be re-classified during operation, after it has already been classified instantaneously before the flow began transmitting content packets.

Updates to the history related to the current traffic flow generally occur after the current traffic flow has completed. This offline classification ensures that the history is updated with the most accurate information, as the traffic characteristics for the entire flow can be used in determining how the history should be updated. During offline classification, all of the traffic characteristics of a completed flow and the information from the DNS response associated with the flow can be used to generate an update to include in the history. In various embodiments, the flow classification component 550 can generate a third lookup table 530. Usually, there are more than one flow (either TCP or UDP) to a FQDN in the same session or in different sessions. For example, in one web page several web resources (e.g., text, javascript, css, png, jpeg, etc.) may be serviced by the same FQDN. Therefore, for each FQDN a listing of the different flows associated with the FQDN is needed to determine the classification type that should be associated with the FQDN. The third lookup table 530 maintains a record of FQDNs and flow information for all flows related to the respective FQDN.

In various embodiments, the flow information comprises a listing of flow objects, where each flow object represents the flow characterization information for each flow related to the FQDN. In various embodiments, a flow object consists of the flow characterization type (i.e., QoS class classification of the specific flow by the flow classification component 550) and one or more weights for each flow. The flow information is updated at the end of a flow associated with the FQDN. If the flow information does not include a flow object associated with a specific flow, the flow classification component 550 may generate a new flow object to include in the flow information for the FQDN. If the table 530 does not include an entry of a FQDN (i.e., a new FQDN is being accessed), a new entry can be made, with a flow information listing generated for the new FQDN.

In various embodiments, the weights of a flow object can be a combination of one or more of: flow classification confidence level; total bytes per flow; or flow duration. In various embodiments, other traffic characteristics may be utilized to develop the weights for a flow object. Nothing in this disclosure should be interpreted as limiting the traffic characteristics used to generate the weights to only the identified characteristics.

Figure 7:
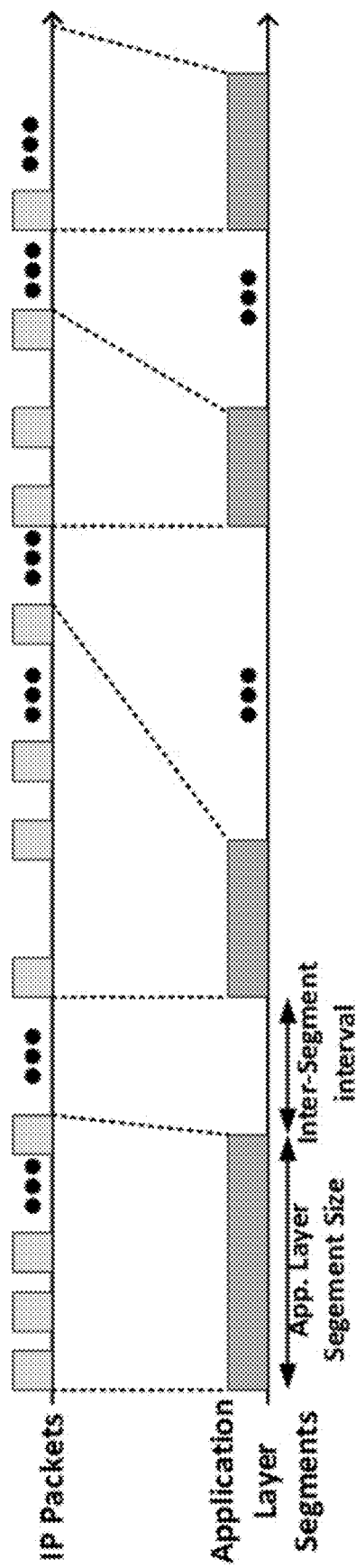
FIG. 7 illustrates such an example characterization in accordance with various embodiments of the technology disclosed herein.

The flow classification component 550 may generate the flow information for the third lookup table 530. In various embodiments, the flow information may be generated by characterizing the application layer segments based on information on IP packets in both directions. FIG. 7 illustrates such an example characterization in accordance with various embodiments of the technology disclosed herein. As illustrated, application layer segments may be explicitly or implicitly reconstructed from information on IP packets to derive application layer segment size and inter arrival time of application layer segments. Non-limiting examples of traffic characteristics which may be used by the flow classification component 550 to generate the flow information include: IP packet level statistics such as packet sizes, inter-packet arrival times, and protocol header information; flow level summary statistics such as total bytes per flow in each direction, total packets per flow in each direction, and flow duration; or TCP level statistics. In various embodiments, the different types of traffic characteristics may be used individually or in combination. The algorithm for classifying the flow can be much simpler than current approaches because classification is only into a set of QoS classes, as opposed to individual application types or various application type classes. In various embodiments, the flow classification component 550 may also utilize flow identification information in generating the flow information for table 530 (e.g., destination and/or source IP; destination and/or source port number; FQDN; etc.).

Referring back to FIG. 5, the information maintained in third lookup table 530 (as generated by the flow classification component 550) is used to update the second lookup table 520, which enables the history-based classification process. As mentioned above, in some cases a FQDN may have several flows associated therewith. However, the second lookup table 520 maps each FQDN to a QoS class. The flow-to-FQDN ("F2F") classification component 560 translates the flow information in the third lookup table 530 into a QoS class to associate with the respective FQDN.

Figure 8:
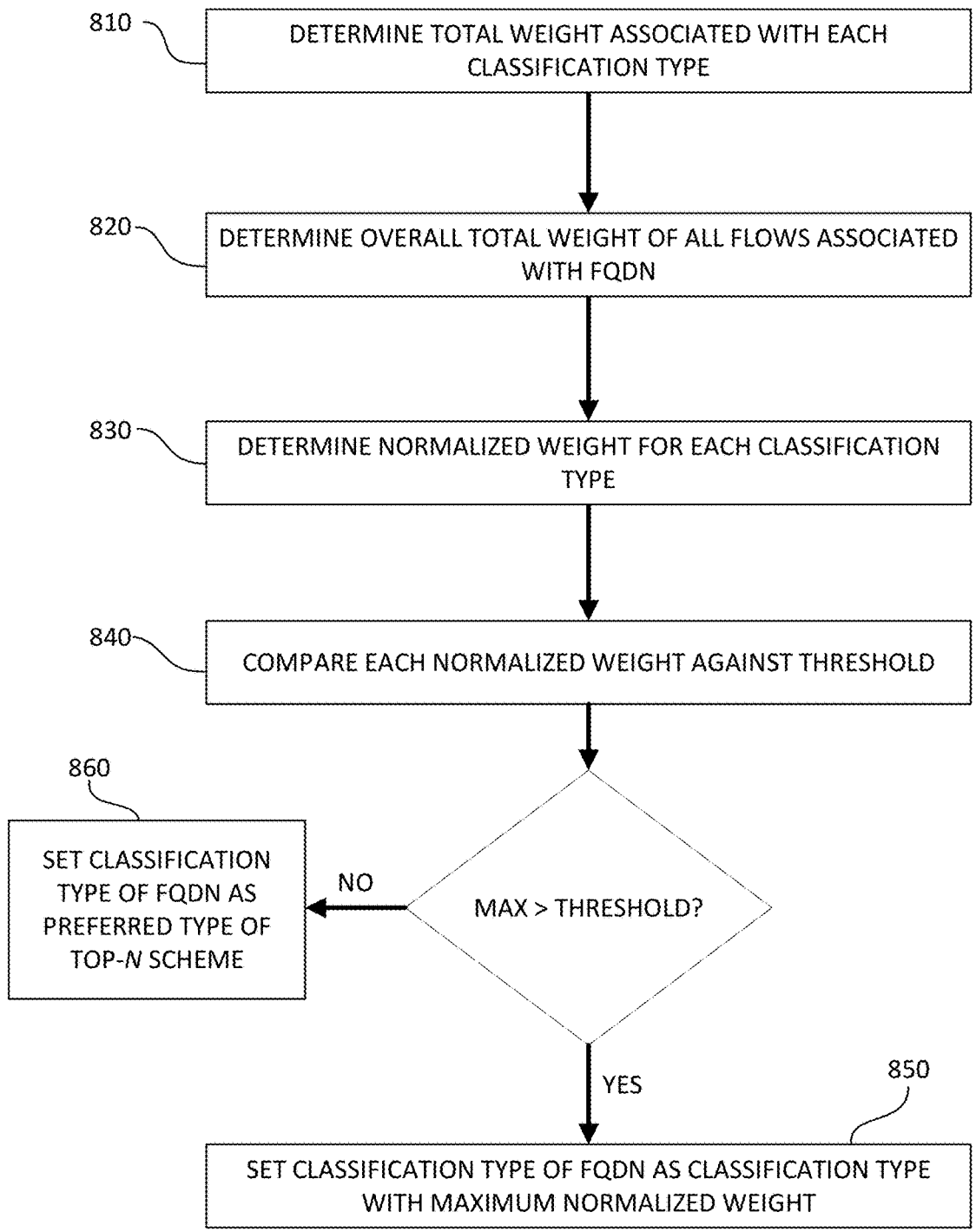
FIG. 8 illustrates an example classification translation process in accordance with various embodiments of the technology disclosed herein

FIG. 8 illustrates an example classification translation process 800 in accordance with various embodiments of the technology disclosed herein. The example process 800 may be implemented by the F2F component 560 in various embodiments. At 810, the F2F component determines the total weight associated with each classification type. For example, assume that the flow information for the FQDN "x.y.z" lists five flow objects: {"interactive", 90}; {"streaming", 20}; {"streaming", 10}; {"interactive", 95}; and {"streaming", 30}. At 810, the F2F component would sum together all the weights associated with flows classification as "interactive" (i.e., 90+95=185) and all the weights associated with flows classification as "streaming" (i.e., 20+10+ 30=60).

At 820, the F2F component determines the overall total weight for all flows of the FQDN. The overall total weight represents the sum of all weights of the FQDN, irrespective of the classification type of a particular flow. Continuing the example from above, the overall total weight for the FQDN "x.y.z" would be 90+10+20+95+30=245. The normalized weight is used by the F2F component to determine a normalized weight for each classification type at 830. For FQDN "x.y.z", the normalized weight for "interactive" is 185/245=0.76, whereas the normalized weight for "streaming" is 60/245=0.24.

At 840, the F2F component compares the normalized weights for each classification type against a threshold. In various embodiments, the threshold may be pre-set by a network administrator, and updated over time by a network administrator. In some embodiments, the threshold may be determined based on a user's behavior and the characteristics of web sites being visited. In various embodiments, the F2F component may select the classification type with the largest normalized weight for comparison. If the maximum normalized weight is greater than the threshold, the F2F component sets the classification type of the FQDN as the classification type of the flow classification type with the maximum normalized weight at 850. For example, for FQDN "x.y.z" the maximum normalized weight is 0.76, associated with the "interactive" QoS class. Assuming the threshold is 0.66, the maximum normalized weight exceeds the threshold (0.76>0.66), so the FQDN mapped to the "interactive" QoS class. The F2F component can update the history to reflect that the FQDN "x.y.z" is to be assigned to "interactive" the next time a TCP SYN packet is received requesting access to "x.y.z".

If the maximum normalized weight matches or does not exceed the threshold, the classification type of the FQDN is set to the preferred classification type identified in the Top-N scheme at 860. The Top-N scheme is an identification of which QoS class is preferred when the flow information for a specific FQDN includes flow classification types for N different QoS classes. For example, assume that the threshold in the above example was set as 0.80. In that case, the maximum normalized weight (0.76 for "interactive") would not exceed the threshold. The F2F component would look to previously determined preferences between different combinations of QoS classes to determine what QoS class to assign to the FQDN. In the example, two QoS classes are included in the flow information: interactive and streaming. Accordingly, the F2F component would look to a Top-2 scheme to see which QoS class is preferred. An example Top-2 scheme is illustrated in Table 1 below.

TABLE 1

| Top-2 Classification Types Scheme | |
| --- | --- |
| Top-2 Classification Types Set | Preferred Classification Type |
| {"Interactive", "Bulk"} | "Interactive" |
| {"Interactive", "Streaming"} | "Interactive" |
| {"Interactive", "Conversational"} | "Interactive" |
| {"Bulk", "Streaming"} | "Streaming" |
| {"Bulk", "Conversational"} | "Conversational" |

For the example discussed above the F2F component would look to see the preferred classification type when both "interactive" and "streaming" flows are associated with the FQDN. Using Table 1, the F2F component would set the FQDN classification type as "interactive", as the "interactive" QoS class is preferred between the two classification types. In various embodiments, the scheme may extend to Top-3, Top-4, etc., depending on the number of QoS classes defined within the network and the number of QoS classes identified in the flow information for the FQDN.

In various embodiments, virtual hosting may impact the use of history-based classification as discussed above with respect to FIG. 3-6. In virtual hosting, a single server with a single IP address is hosting multiple domain names (FQDNs) to share computing resources of the server. Different FQDNs virtually hosted on a single IP address may server completed different content providers. Therefore, different types of resources may be served by different FQDNs hosted on the same IP address. In some systems, there may be some close proximity in time between DNS request/response and TCP SYN for a particular flow, and time proximity to associate a particular flow with a FQDN in a DNS request/response. In some systems, however, arrival of DNS request/response and TCP SYN of a flow may be completely independent and cannot be correlated.

One method to overcome the issues introduced by virtual hosting is to select one FQDN from a list of many FQDNs. If time proximity can be leveraged, the FQDN contained in the DNS response can be selected as the one to be used for classification and updating. If time proximity cannot be leveraged, the FQDN most frequently seen can be selected.

Another method to overcome the issues introduced by virtual hosting is to select all FQDNs in the list and use the IP address as one label to represent all FQDNs. Here, the IP address of the destination server would serve as the lookup key for determining which QoS class to assign. All the flows destined for all FQDNs associated with the same IP address will be associated with the same label in the history. Using the example classification translation process 800 discussed with respect to FIG. 8, a classification type is selected for that IP address. When a new flow related to any FQDN associated with that IP address sends a TCP SYN packet, the classifier will instantaneously classify the flow according to the QoS class associated with the IP address.

Although discussed with respect to FQDN, the embodiments of the technology disclosed herein are applicable where the IP address is used as the lookup key for the history-based classification. In such embodiments, the same weighting and QoS class determination is applicable based on the use of IP addresses. Nothing in this disclosure should be interpreted as limiting the scope only to embodiments where the FQDN is used as the lookup key. For example, where the IP address is used the method may avoid determining an associated FQDN with the IP address before determining what QoS class should be associated with the IP address based on traffic characteristics.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

The term tool can be used to refer to any apparatus configured to perform a recited function. For example, tools can include a collection of one or more components and can also be comprised of hardware, software or a combination thereof. Thus, for example, a tool can be a collection of one or more software components, hardware components, software/hardware components or any combination or permutation thereof. As another example, a tool can be a computing device or other appliance on which software runs or in which hardware is implemented.

Figure 9:
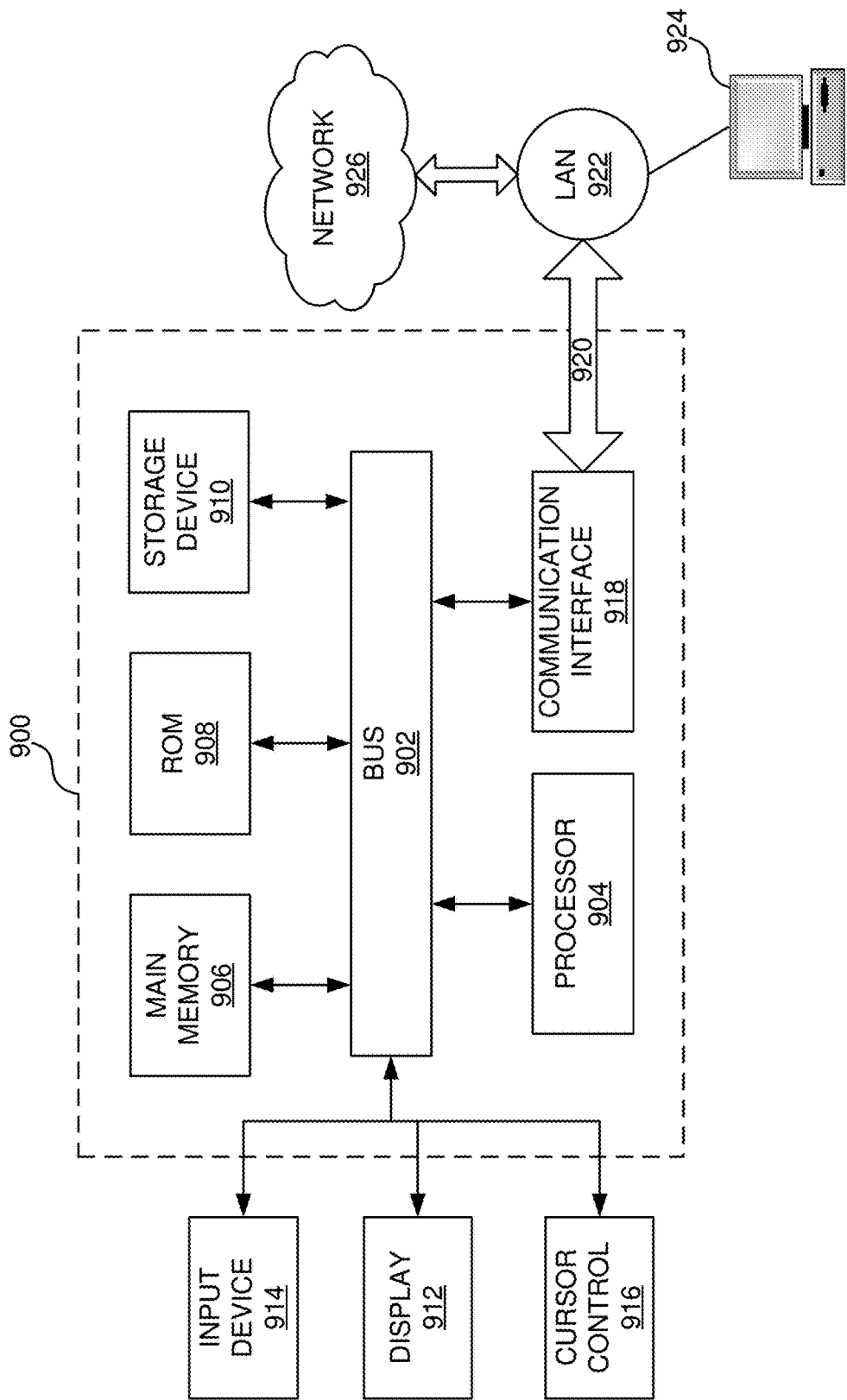
FIG. 9 is an example computing component that may be used in implementing various features of embodiments of the disclosed technology.

FIG. 9 illustrates a computer system 900 upon which example embodiments according to the present invention can be implemented. Computer system 900 can include a bus 902 or other communication mechanism for communicating information, and a processor 904 coupled to bus 902 for processing information. Computer system 900 may also include main memory 906, such as a random access memory (RAM) or other dynamic storage device, coupled to bus 902 for storing information and instructions to be executed by processor 904. Main memory 906 can also be used for storing temporary variables or other intermediate information during execution of instructions to be executed by processor 904. Computer system 900 may further include a read only memory (ROM) 908 or other static storage device coupled to bus 902 for storing static information and instructions for processor 904. A storage device 910, such as a magnetic disk or optical disk, may additionally be coupled to bus 902 for storing information and instructions.

Computer system 900 can be coupled via bus 902 to a display 912, such as a cathode ray tube (CRT), liquid crystal display (LCD), active matrix display, light emitting diode (LED)/organic LED (OLED) display, digital light processing (DLP) display, or plasma display, for displaying information to a computer user. An input device 914, such as a keyboard including alphanumeric and other keys, may be coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912.

According to one embodiment of the invention, dynamic bandwidth management, in accordance with example embodiments, are provided by computer system 900 in response to processor 904 executing an arrangement of instructions contained in main memory 906. Such instructions can be read into main memory 906 from another computer-readable medium, such as storage device 910. Execution of the arrangement of instructions contained in main memory 906 causes processor 904 to perform one or more processes described herein. One or more processors in a multiprocessing arrangement may also be employed to execute the instructions contained in main memory 906. In alternative embodiments, hard-wired circuitry is used in place of or in combination with software instructions to implement various embodiments. Thus, embodiments described in the present disclosure are not limited to any specific combination of hardware circuitry and software.

Computer system 900 may also include a communication interface 918 coupled to bus 902. Communication interface 918 can provide a two-way data communication coupling to a network link 920 connected to a local network 922. By way of example, communication interface 918 may be a digital subscriber line (DSL) card or modem, an integrated services digital network (ISDN) card, a cable modem, or a telephone modem to provide a data communication connection to a corresponding type of telephone line. As another example, communication interface 918 may be a local area network (LAN) card (e.g. for Ethernet™ or an Asynchronous Transfer Model (ATM) network) to provide a data communication connection to a compatible LAN. Wireless links can also be implemented. In any such implementation, communication interface 918 sends and receives electrical, electromagnetic, or optical signals that carry digital data streams representing various types of information. Further, communication interface 918 may include peripheral interface devices, such as a Universal Serial Bus (USB) interface, a PCMCIA (Personal Computer Memory Card International Association) interface, etc.

Network link 920 typically provides data communication through one or more networks to other data devices. By way of example, network link 920 can provide a connection through local network 922 to a host computer 924, which has connectivity to a network 926 (e.g. a wide area network (WAN) or the global packet data communication network now commonly referred to as the "Internet") or to data equipment operated by service provider. Local network 922 and network 926 may both use electrical, electromagnetic, or optical signals to convey information and instructions. The signals through the various networks and the signals on network link 920 and through communication interface 918, which communicate digital data with computer system 900, are example forms of carrier waves bearing the information and instructions.

Computer system 900 may send messages and receive data, including program code, through the network(s), network link 920, and communication interface 918. In the Internet example, a server (not shown) might transmit requested code belonging to an application program for implementing an embodiment of the present invention through network 926, local network 922 and communication interface 918. Processor 904 executes the transmitted code while being received and/or store the code in storage device 910, or other non-volatile storage for later execution. In this manner, computer system 900 obtains application code in the form of a carrier wave.

The term "computer-readable medium" as used herein refers to any medium that participates in providing instructions to processor 904 for execution. Such a medium may take many forms, including but not limited to non-volatile media, volatile media, and transmission media. Non-volatile media include, for example, optical or magnetic disks, such as storage device 910. Volatile media may include dynamic memory, such as main memory 906. Transmission media may include coaxial cables, copper wire and fiber optics, including the wires that comprise bus 902. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. By way of example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Figure 10:
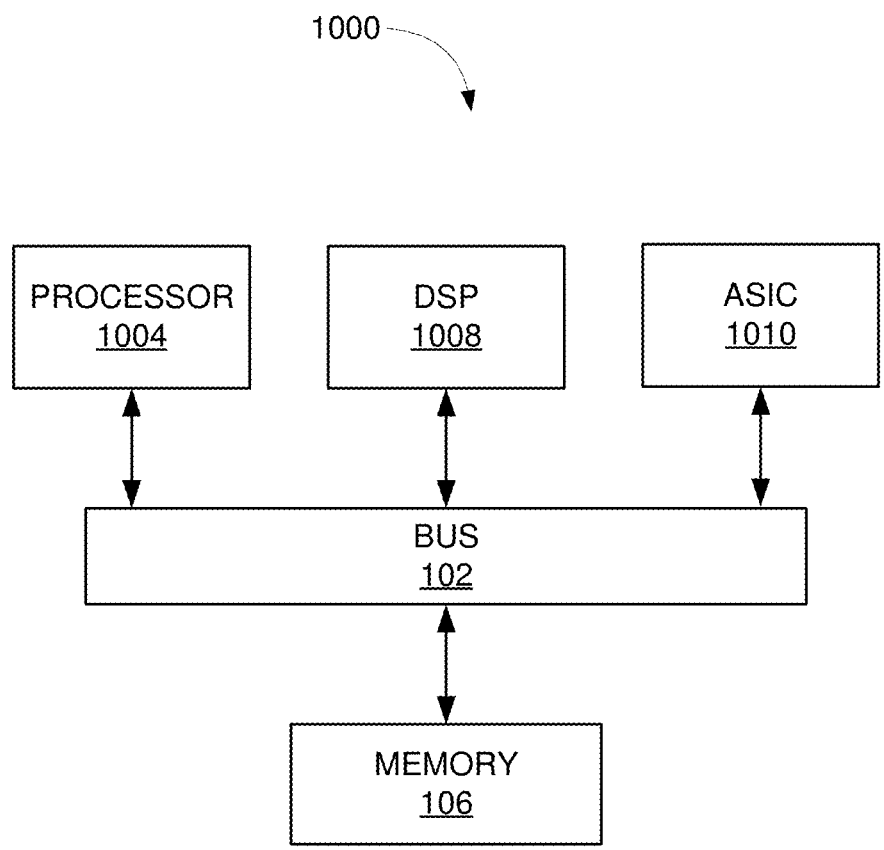
FIG. 10 illustrates an example chip set that can be utilized in implementing architectures and methods in accordance with various embodiments of the technology disclosed herein.

FIG. 10 illustrates a chip set 1000 in which embodiments of the invention may be implemented. Chip set 1000 can include, for instance, processor and memory components described with respect to FIG. 10 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 1000 includes a communication mechanism such as a bus 1002 for passing information among the components of the chip set 1000. A processor 1004 has connectivity to bus 1002 to execute instructions and process information stored in a memory 1006. Processor 1004 includes one or more processing cores with each core configured to perform independently. A multi-core processor enables multiprocessing within a single physical package. Examples of a multi-core processor include two, four, eight, or greater numbers of processing cores. Alternatively or in addition, processor 1004 includes one or more microprocessors configured in tandem via bus 1002 to enable independent execution of instructions, pipelining, and multithreading. Processor 1004 may also be accompanied with one or more specialized components to perform certain processing functions and tasks such as one or more digital signal processors (DSP) 1008, and/or one or more application-specific integrated circuits (ASIC) 1010. DSP 1008 can typically be configured to process real-world signals (e.g., sound) in real time independently of processor 1004. Similarly, ASIC 1010 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 1004 and accompanying components have connectivity to the memory 906 via bus 1002. Memory 1006 includes both dynamic memory (e.g., RAM) and static memory (e.g., ROM) for storing executable instructions that, when executed by processor 1004, DSP 1008, and/or ASIC 1010, perform the process of example embodiments as described herein. Memory 1006 also stores the data associated with or generated by the execution of the process.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components or components of the application are implemented in whole or in part using software, in one embodiment, these software elements can be implemented to operate with a computing or processing component capable of carrying out the functionality described with respect thereto. One such example computing component is shown in FIG. 8. Various embodiments are described in terms of this example-computing component 800. After reading this description, it will become apparent to a person skilled in the relevant art how to implement the application using other computing components or architectures.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

What is claimed is:

1. A method of traffic classification, comprising:
   receiving, at a traffic classifier, a first flow packet of a current traffic flow;
   identifying, by the traffic classifier, a target destination of the current traffic flow based on the first flow packet;
   checking a history, by the traffic classifier, wherein the history associates a plurality of target destinations with an associated classification type, wherein the history comprises a lookup table mapping one or more IP addresses to one or more FQDNs, and a lookup table mapping each FQDN of the one or more FQDNs to a quality of service ("QoS") class, wherein the lookup table mapping each FQDN of the one or more FQDNs to a QoS class is updated over time using received traffic flows; and
   using at least the check of the history, tagging, by the traffic classifier, the current traffic flow as belonging to the classification type associated with the target destination;
   wherein the classification type comprises one of a plurality of QoS classes having one or more QoS requirements.

2. The method of claim 1, wherein the first flow packet is a TCP SYN packet, and identifying a target destination further comprises identifying a target destination of the current traffic flow based on the TCP SYN packet and a DNS response message.

3. The method of claim 1, wherein the traffic classifier is implemented within one or more of: a consumer premise equipment ("CPE") device; a network device located at a network gateway; or a network device located at a bottleneck link within a network.

4. The method of claim 1, wherein the target destination is identified by a FQDN.

5. The method of claim 1, wherein the target destination is identified by an IP address.

6. The method of claim 5, wherein the history comprises a lookup table mapping each IP address of a plurality of IP addresses to a classification type.

7. The method of claim 1, wherein the current traffic flow comprises encrypted traffic.

8. The method of claim 1, further comprising:
   collecting a plurality of traffic characteristics associated with the current traffic flow;
   updating the history based on the collected plurality of traffic characteristics at completion of the current traffic flow.

9. The method of claim 1, further comprising:
during the current traffic flow, performing real-time classification of the current traffic flow based on measure traffic characteristics; and
if a real-time classification type of the current traffic flow differs from the classification type tagged based on the history, identifying the real-time classification type.

10. A method of traffic classification, comprising:
receiving, at a traffic classifier, a first flow packet of a current traffic flow; identifying, by the traffic classifier, a target destination of the current traffic flow
based on the first flow packet;
checking a history, by the traffic classifier, wherein the history associates a plurality of target destinations with an associated classification type; and
tagging, by the traffic classifier, the current traffic flow as belonging to the classification type associated with the target destination;
wherein the classification type comprises one of a plurality of quality of service ("QoS") classes having one or more QoS requirements; and
wherein checking the history comprises if the history does not contain an association between the target destination and a classification type, determining a recommended classification type based on information in the history.

11. The method of claim 10, wherein determining a recommended classification type comprises using a recommendation scheme, the recommendation scheme comprising one of: a similarity-based scheme; a keyword-based scheme; or a popularity-based scheme.

12. The method of claim 11, wherein the traffic classifier is configured to use two or more recommendation schemes.

13. An instantaneous traffic classification system, comprising:
a traffic classifier comprising a history comprising a lookup table mapping one or more IP addresses of one or more target destinations to one or more FQDNs, and a lookup table mapping each FQDN of the one or more FQDNs to a quality of service ("QoS") classification type of one or more QoS classification types, wherein the lookup table mapping each FQDN of the one or more FQDNs to a QoS classification type is updated over time using received traffic flows; and
one or more queues configured to store a plurality of traffic flows, each queue associated with a respective QoS classification type of the one or more QoS classification types;
wherein the traffic classifier is configured to classify a current traffic flow as a QoS classification type of the one or more QoS classification types before any content packets of the current traffic flow are transmitted.

14. The system of claim 13, wherein the traffic classifier is implemented within one or more of: a consumer premise equipment ("CPE") device; a network device located at a network gateway; or a network device located at a bottleneck link within a network.

15. A method of updating a history for a history-based traffic classification system, comprising:
determining a flow information set for a target destination of a plurality of target destinations, wherein the flow information set includes a flow object for each traffic flow associated with each target destination, each flow object identifying a flow classification type and one or more weights;
determining a total weight associated with each flow classification type present in the flow information set;
determining an overall total weight comprising the sum of all weights associated with all flow classification types present in the flow information set;
using at least the determined total weight associated with each flow classification type and the determined overall total weight to determine normalized weights for each flow classification type present in the flow information set;
determining a maximum normalized weight from a set of normalized weights;
compare the maximum normalized weight against a threshold value;
if the maximum normalized weight exceeds the threshold value, setting the flow classification type associated with the maximum normalized weight as a classification type for the target destination; and
updating a history to identify the target destination as associated with the set classification type for the target destination.

16. The method of claim 15, further comprising:
if the maximum normalized weight does not exceed the threshold, determining a preferred classification type between a set of flow classification types present in the flow information set; and;
update the history to identify the target destination as associated with the preferred classification type.

17. The method of claim 16, determining the preferred classification type comprises checking a Top-N table, the Top-N table having entries identifying the preferred classification types when N classification types are present in the flow information set.

18. The method of claim 15, wherein the target destination is a Fully Qualified Domain Name ("FQDN").

19. The method of claim 15, wherein the target destination is an IP address.

* * * * *